(12) United States Patent
Muddu et al.

(10) Patent No.: US 8,745,553 B2
(45) Date of Patent: Jun. 3, 2014

(54) METHOD AND APPARATUS FOR APPLYING POST GRAPHIC DATA SYSTEM STREAM ENHANCEMENTS

(75) Inventors: Swamy Muddu, Milpitas, CA (US); Sriram Madhavan, Santa Clara, CA (US); Shobhit Malik, Sunnyvale, CA (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 0 days.

(21) Appl. No.: 13/592,434

(22) Filed: Aug. 23, 2012

(65) Prior Publication Data

US 2014/0059506 A1 Feb. 27, 2014

(51) Int. Cl.
*G06F 17/50* (2006.01)

(52) U.S. Cl.
USPC ................................ 716/54; 716/56; 716/112

(58) Field of Classification Search
USPC .............................................. 716/54, 56, 112
See application file for complete search history.

(56) References Cited

U.S. PATENT DOCUMENTS

| | | | |
|---|---|---|---|
| 6,415,421 B2 * | 7/2002 | Anderson et al. | 716/52 |
| 6,901,564 B2 * | 5/2005 | Stine et al. | 716/56 |
| 7,100,134 B2 * | 8/2006 | Wu et al. | 716/52 |
| 7,219,317 B2 * | 5/2007 | Lakshmanan et al. | 716/112 |
| 7,269,804 B2 * | 9/2007 | Tabery et al. | 716/53 |
| 7,302,654 B2 * | 11/2007 | Lakshmanan et al. | 716/112 |
| 7,458,045 B2 * | 11/2008 | Cote et al. | 716/103 |
| 7,543,260 B2 * | 6/2009 | Ueda | 716/119 |
| 7,627,837 B2 * | 12/2009 | Zhang | 716/53 |
| 7,698,676 B1 * | 4/2010 | Qian | 716/119 |
| 7,739,632 B2 * | 6/2010 | Bergman Reuter et al. | 716/136 |
| 7,760,347 B2 * | 7/2010 | Nehmadi et al. | 356/237.4 |
| 7,784,019 B1 * | 8/2010 | Zach | 716/53 |
| 7,962,867 B2 * | 6/2011 | White et al. | 716/54 |
| 2005/0015740 A1 * | 1/2005 | Sawicki et al. | 716/11 |
| 2008/0162103 A1 * | 7/2008 | White et al. | 703/13 |
| 2010/0229133 A1 * | 9/2010 | Pikus | 716/4 |

* cited by examiner

*Primary Examiner* — Naum Levin (74) *Attorney, Agent, or Firm* — Ditthavong Mori & Steiner, P.C.

(57) ABSTRACT

An approach is provided for applying post graphic data system (GDS) stream enhancements back to the design stage. Embodiments include receiving a data stream of an integrated circuit design layout from a design stage, determining one or more design constructs based on an analysis of the data stream, determining one or more instructions to implement the one or more design constructs at the design stage, and sending the instructions to the design stage to implement the one or more design constructs.

16 Claims, 6 Drawing Sheets

METHOD AND APPARATUS FOR APPLYING POST GRAPHIC DATA SYSTEM STREAM ENHANCEMENTS

TECHNICAL FIELD

The present disclosure relates to technology for implementing integrated circuit (IC) design layout enhancements, and in particular, to implementing IC design layout enhancements after data stream-outs from the IC design stage.

BACKGROUND

Manufacturability-aware physical IC design processes, which take into account such factors as yield and reliability, are becoming increasingly important aspects in bridging the gap between what is designed and what is actually produced or fabricated. Traditionally, physical IC design verification has focused primarily on design verification rules-based approaches. For example, design rule checking (DRC) is an area of electronic design automation (EDA) that enables IC designers to determine whether a particular physical layout design satisfies a series of parameters, also referred to as design rules. Design rules are typically provided by IC manufacturers (e.g., foundries) to enable IC designers to verify the "correctness" of their physical layout patterns. In this manner, design rules are often associated with specific manufacturing processes. Thus, a set of design rules may specify certain IC features (e.g., geometric element) and/or connectivity restrictions to ensure sufficient margins are present to account for the variability in one or more manufacturing processes. As such, design rule checking is a major step during physical verification of physical IC layout configurations performed by the IC designers.

As the demand for increased feature densities grows and manufacturing processes evolve, design rule sets are becoming increasingly more complex. Accordingly, one objective of design verification is to achieve a certain level of yield and reliability for a particular physical IC layout pattern. If design rules are violated the design may not be functional. To meet this goal of improving yield and/or reliability, design verification has evolved from simple measurement and Boolean check-based techniques to processes that modify existing features, insert new features, and check entire designs for process limitations. A completed layout consists not only of the geometric representation of the design itself, but also data that provides support for manufacturing the design. While design verification processes do not necessarily ensure a particular physical IC layout pattern will operate correctly, these processes are constructed to at least verify that the physical configuration meets certain processing constraints for given design types and/or manufacturing process technologies. Thus, as physical IC layout patterns become more complex, the execution of design verification techniques is becoming evermore computationally intensive. For instance, some design verification techniques, if executed on a single processing platform, may require several days (if not weeks) to generate results. In competitive environments like the semiconductor industry, however, design cycles need to be as short as possible; lengthy design verification processes only burden such efforts.

The above-described process-driven yield enhancement is performed prior to mask data preparation (MDP), which precludes the possibility of analysis of layout changes on certain design metrics. Thus, potential post-layout enhancements, including changes to the graphic data system (GDS) stream for opportunistic insertion of redundant vertical interconnect accesses (VIAs) and shapes to enhance manufacturability, or shape shifting to improve critical areas (e.g., those susceptible to random defects), are not possible. Further, as technology scales, design analyses must increasingly account for the design performance impact of manufacturing enhancements and the computational scalability of manufacturing enhancement techniques as layout data size quadruples with every technology node.

A need, therefore, exists for methodology enabling the enhancement and/or modification of layout data in the IC design stage with semantics passed from manufacturability analysis/yield enhancement tools at the manufacturer back to the designer. There exists a particular need for methodology enabling the insertion of manufacturability and/or yield-enhancing design constructs during the design stage (e.g., layout synthesis, more specifically, in detail routing) based on analysis from the pre-MDP or IC manufacturability analysis stages. The pre-MDP stage entails detailed analysis of the layout for ensuring its manufacturability in the process, through the use of various design for manufacturability (DFM) tools.

SUMMARY

An aspect of the present disclosure is a method for implementing IC design layout enhancements and optimizations determined after graphic data system stream-out back at the design stage.

Another aspect of the present disclosure is an apparatus for implementing IC design layout enhancements and optimizations determined after GDS stream-out back at the design stage.

Additional aspects and other features of the present disclosure will be set forth in the description which follows and in part will be apparent to those having ordinary skill in the art upon examination of the following or may be learned from the practice of the present disclosure. The advantages of the present disclosure may be realized and obtained as particularly pointed out in the appended claims.

According to the present disclosure, some technical effects may be achieved in part by a method including: receiving a data stream (e.g., GDS, GDSII, OASIS) of an integrated circuit design layout from a design stage; determining one or more design constructs based on an analysis of the data stream; and determining one or more instructions to implement the one or more design constructs at the design stage.

Aspects of the present disclosure include determining one or more enhancements based on one or more of a layout density, printability, a hotspot, and a critical-area effect associated with the integrated circuit design layout, and determining the one or more design constructs based on the one or more enhancements. Another aspect includes optimizing one or more layout shapes in the integrated circuit design layout to obtain an optimized integrated circuit design layout, and determining the one or more design constructs based on the optimization. Other aspects include extracting one or more new layout features from the optimized integrated circuit design layout, determining a physical location and one or more characteristics of the one or more new layout features, and determining one or more router-specific directives to replicate instantiation of the one or more new layout features. Additional aspects include the one or more new layout features including at least one VIA. Further aspects include performing a shape classification of the one or more new layout features, and clustering the one or more new layout features based on the shape classification. Other aspects include determining one or more elemental features based on the classified and clustered one or more new layout features, wherein the one or more instructions include the one or more router-specific directives based on the one or more elemental features. Another aspect includes transmitting the one or more elemental features via the one or more router-specific directives to the design stage to replicate instantiation of the one or more new layout features. An additional aspect includes enhancing the integrated circuit design layout according to one or more engineering change orders based on the one or more design constructs.

Another aspect of the present disclosure is an apparatus including at least one processor, and at least one memory including computer program code for one or more programs, the at least one memory and the computer program code configured to, with the at least one processor, cause the apparatus to perform at least the following: receive a data stream (e.g., GDS, GDSII, OASIS) of an integrated circuit design layout from a design stage, determine one or more design constructs based on an analysis of the data stream, and determine one or more instructions to implement the one or more design constructs at the design stage.

Aspects of the present disclosure include wherein the apparatus is at least further caused to: determine one or more enhancements based on one or more of a layout density, printability, a hotspot, and a critical-area effect associated with the integrated circuit design layout, and determine the one or more design constructs based on the one or more enhancements. Another aspect includes the apparatus further being caused to optimize one or more layout shapes in the integrated circuit design layout to obtain an optimized integrated circuit design layout, and determine the one or more design constructs based on the optimization. Another aspect includes the apparatus further being caused to extract one or more new layout features from the optimized integrated circuit design layout, determine a physical location and one or more characteristics of the one or more new layout features, and determine one or more router-specific directives to replicate instantiation of the one or more new layout features. Another aspect includes the one or more new layout features include at least one VIA. An additional aspect includes the apparatus being further caused to perform a shape classification of the one or more new layout features, and cluster the one or more new layout features based on the shape classification. Another aspect includes the apparatus being further caused to determine one or more elemental features based on the classified and clustered one or more new layout features, wherein the one or more instructions include the one or more router-specific directives based on the one or more elemental features. A further aspect includes the apparatus being caused to transmit the one or more elemental features via the one or more router-specific directives to the design stage to replicate instantiation of the one or more new layout features. Another aspect includes the apparatus being further caused to enhance the integrated circuit design layout according to one or more engineering change orders based on the one or more design constructs.

Another aspect of the present disclosure is a method including: receiving a data stream (e.g., GDS, GDSII, OASIS) of an integrated circuit design layout from a design stage, performing manufacturability analysis and yield-enhancement analysis on the integrated circuit design layout, determining one or more new layout shapes, one or more new layout structures, or a combination thereof, optimizing the one or more new layout shapes, the one or more new layout structures, or a combination thereof, determining one or more router-specific directives based on the one or more optimized layout shapes, the one or more optimized layout structures, or a combination thereof, and transmitting the one or more router-specific directives to the design stage. An aspect of the present disclosure includes the one or more new layout structures including a VIA.

Additional aspects and technical effects of the present disclosure will become readily apparent to those skilled in the art from the following detailed description wherein embodiments of the present disclosure are described simply by way of illustration of the best mode contemplated to carry out the present disclosure. As will be realized, the present disclosure is capable of other and different embodiments, and its several details are capable of modifications in various obvious respects, all without departing from the present disclosure. Accordingly, the drawings and description are to be regarded as illustrative in nature, and not as restrictive.

BRIEF DESCRIPTION OF THE DRAWINGS

The present disclosure is illustrated by way of example, and not by way of limitation, in the figures of the accompanying drawing and in which like reference numerals refer to similar elements and in which.

DETAILED DESCRIPTION

In the following description, for the purposes of explanation, numerous specific details are set forth in order to provide a thorough understanding of exemplary embodiments. It should be apparent, however, that exemplary embodiments may be practiced without these specific details or with an equivalent arrangement. In other instances, well-known structures and devices are shown in block diagram form in order to avoid unnecessarily obscuring exemplary embodiments. In addition, unless otherwise indicated, all numbers expressing quantities, ratios, and numerical properties of ingredients, reaction conditions, and so forth used in the specification and claims are to be understood as being modified in all instances by the term "about."

The present disclosure addresses and solves a problem of being able to implement manufacturability analysis and/or yield enhancements determined post mask data preparation (MDP) and graphic data system (GDS) stream-out at the design stage. In accordance with embodiments of the present disclosure, design constructs representing the manufacturability analysis and yield enhancements are passed back to the design stage from the manufacturability analysis stage using replicated elemental design features representing the design layout features thereby minimizing the data required to transmit back to the design stage.

Methodology in accordance with embodiments of the present disclosure includes: receiving a data stream (e.g., GDS, GDSII, OASIS) of an integrated circuit design layout from a design stage, determining one or more design constructs based on an analysis of the data stream, and determining one or more instructions to implement the one or more design constructs at the design stage. Additional methodology in accordance with embodiments of the present disclosure includes: receiving a data stream (e.g., GDS, GDSII, OASIS) of an integrated circuit design layout from a design stage, performing manufacturability analysis and yield-enhancement analysis on the integrated circuit design layout, determining one or more new layout shapes, one or more new layout structures, or a combination thereof, optimizing the one or more new layout shapes, the one or more new layout structures, or a combination thereof, determining one or more router-specific directives based on the one or more optimized layout shapes, the one or more optimized layout structures, or a combination thereof, and transmitting the one or more router-specific directives to the design stage.

Still other aspects, features, and technical effects will be readily apparent to those skilled in this art from the following detailed description, wherein preferred embodiments are shown and described, simply by way of illustration of the best mode contemplated. The disclosure is capable of other and different embodiments, and its several details are capable of modifications in various obvious respects. Accordingly, the drawings and description are to be regarded as illustrative in nature, and not as restrictive.

Figure 1:
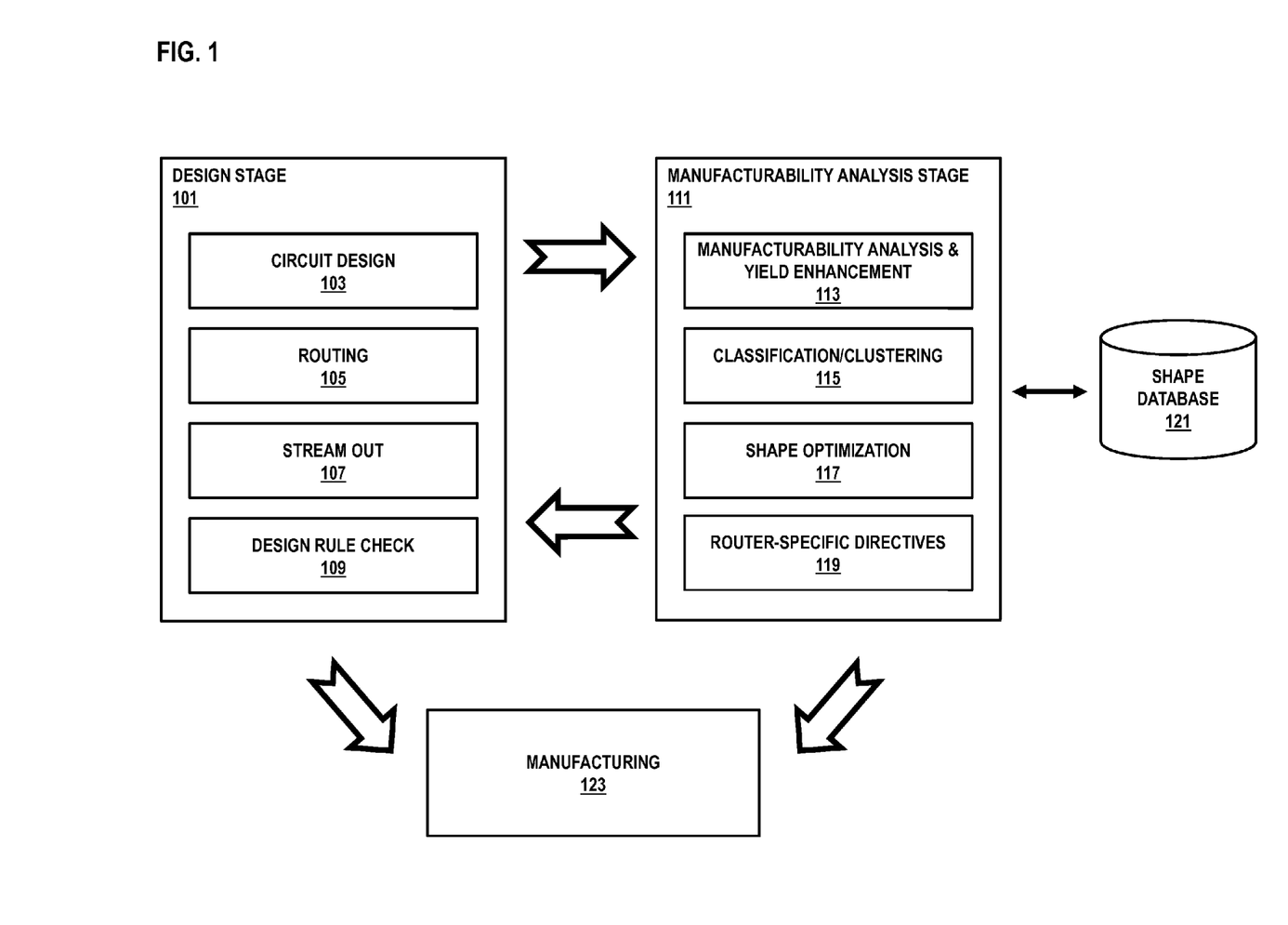
FIG. 1 schematically illustrates an overall system flow for implementing manufacturability and/or yield enhancements from the manufacturability analysis stage back at a design stage, according to an exemplary embodiment.

FIG. 1 schematically illustrates an overall system flow for implementing manufacturability and/or yield enhancements from the manufacturability analysis stage back at a design stage, according to an exemplary embodiment. System flow 100 may be associated with at least one IC design/manufacturing process and, thereby, at least one IC designer and IC manufacturer. In this manner, the IC designer may first design an IC design layout at a design stage 101. The design stage 101 may include a number of substages (hereinafter stages) beginning with a circuit design stage 103 that may include logic synthesis/circuit design, in addition to physical embedding (e.g., placement) associated with the design layout. After the circuit design stage 103, the design stage 101 may include a routing stage 105 where interconnect wires are determined to connect features of the IC design layout form the circuit design stage 103. The design stage 101 may further include a stream out stage 107 where the information constituting the IC design layout determined in the circuit design stage 103 and the routing stage 105 are compiled into a data stream. The data stream may be based on the format of, for example, the graphic data system (GDS or GDSII) or the open artwork system interchange standard (OASIS). After the stream out stage 107, the IC design layout may undergo design rule checks at the design rule check stage 109. The design rule check stage 109 determines whether the IC design layout satisfies a series of design rules. These design rules may be provided to the IC designer by the IC manufacturer and allow the IC designer to verify the correctness of an IC design layout, to a certain degree, based on the design rules. Such design rules may be a coarse review of the IC design layout carried out by the IC designer.

After the design rule check stage 109, the IC design layout is sent to the IC manufacturer at a manufacturability analysis stage 111, which also includes several substages (hereinafter stages). The manufacturability analysis stage 111 includes a manufacturability analysis and yield enhancement stage 113 (hereinafter enhancement stage 113). The enhancement stage 113 performs design manufacturability analysis on the IC design layout in the data stream (e.g., GDS, GDSII, OASIS) from the IC designer. The enhancement stage 113 analyzes the IC design layout for issues concerning layout density, printability, hotspots and critical-area effects. The enhancement stage 113 then performs an optimization of the IC design layout by changing layout shapes and/or inserting new shapes and/or features into the IC design layout. The new shapes and/or features may be determined from a shape database 121 associated with the manufacturability analysis stage 111. The shape database 121 may include shapes that the IC manufacturer has previously created to correct issues determined from the manufacturability analysis and yield enhancements.

The enhancement stage 113 also determines design constructs for implementing changes at the design stage 101. The design constructs may include the new layout shapes and/or features, such as new vertical interconnect accesses (VIAs), as well as specific layout change instructions (e.g., engineering change orders (ECOs)). The analysis performed at the enhancement stage 113 may be simulation-based or model-based methods of analysis of the IC design layout from the design stage, such as by using highly-accurate manufacturability models, such as lithographic or other manufacturing-based models, that are not available to the IC designers during the design stage 101.

Once the enhancement stage 113 has analyzed the IC design layout, the manufacturability analysis stage 111 extracts the new shapes and/or features that have been inserted into the IC design layout and constructs a database of all of the new shapes and/or features, which also may be stored in the shape database 121. Along with the new shapes and/or features of the IC design layout, characteristics of the new shapes and/or features are also extracted. The characteristics may include distances between shapes, proximities, etc. within the IC design layout.

The manufacturability analysis stage 111 then performs a classification and clustering of the new shapes and/or features that are determined from the enhancement stage 113 at the classification/clustering stage 115. Based on the classification/clustering, the manufacturability analysis stage 111 may include a shape optimization stage 117. At the shape optimization stage 117, the new shapes and/or features may be broken down into simplified elements that may be combined in various ways to represent the new shapes and/or features. For example, a new shape within the IC design layout may be an L-shape, which may be represented by multiple instances of an optimized square-shaped feature. Subsequently, the router-specific directives stage 119 may derive router-specific instructions to replicate instantiation of the new shapes and/or features determined from the enhancement stage 113 based on the simplified elements determined at the shape optimization stage 117. The router-specific instructions may then be sent back to the design stage 101 for implementation (e.g., during the routing stage 105).

The above flow of information between the design stage 101 and the manufacturability analysis stage 111 may occur once, such as transferring information representing the IC design layout from the design stage 101 to the manufacturability analysis stage 111 and back to the design stage 101 for further analysis and design of the IC design layout. Alternatively, the flow of information may repeat multiple times based on the manufacturability analysis and yield enhancement of the IC design layout from the design stage 101. After the above sequence of steps, a regular IC design layout sign-off may occur, and the conventional IC design manufacturing 123 may commence.

Figure 2:
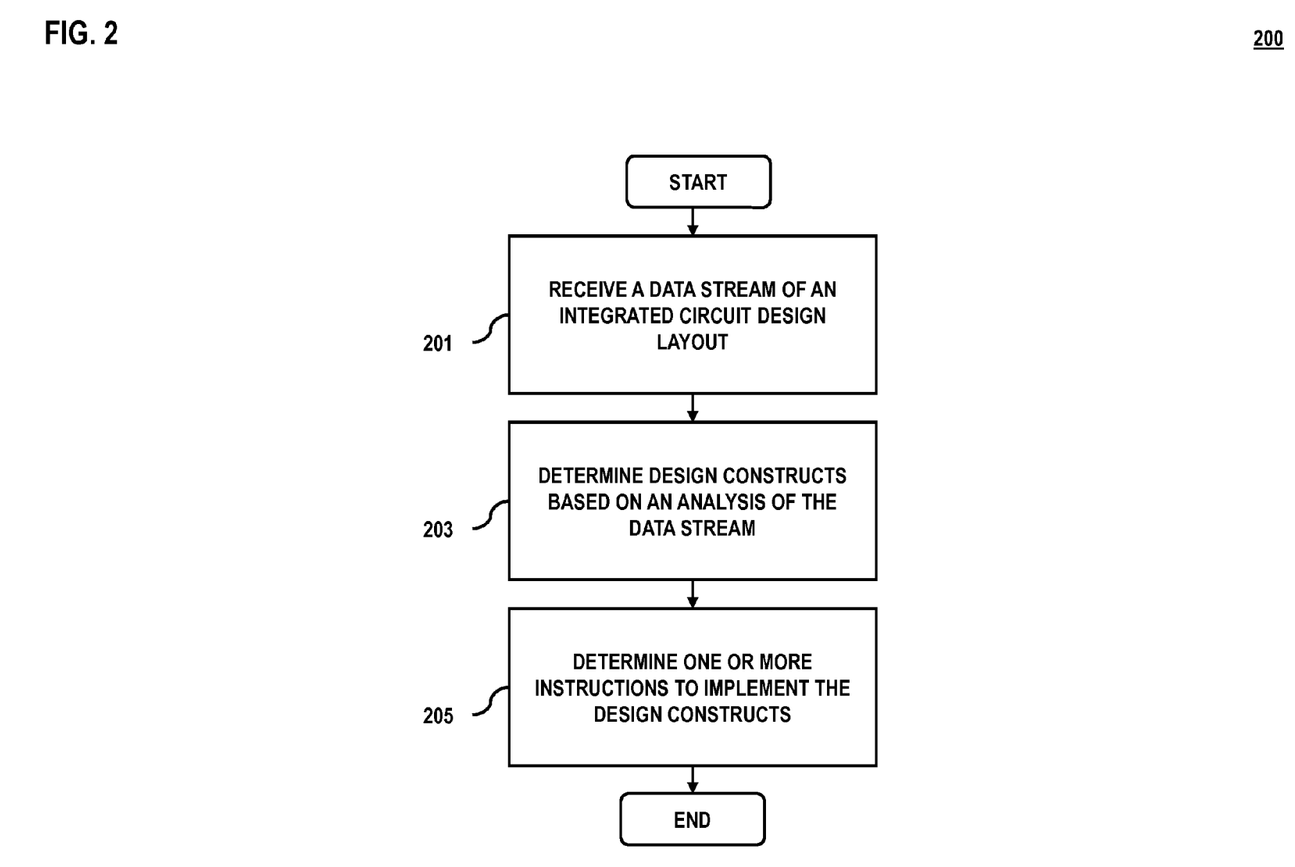
FIG. 2 is a flowchart of a process for determining instructions for implementing one or more design constructs from an analysis at the manufacturability analysis stage back at the design stage, according to an exemplary embodiment.

FIG. 2 is a flowchart of a process for determining instructions for implementing one or more design constructs from analysis at the IC manufacturer, according to an exemplary embodiment. At step 201, an IC manufacturability analysis stage 111 receives a data stream from an IC designer. The data stream represents the information associated with an IC design layout. The data stream may be in any format, such as in GDS, GDSII, or OASIS. The IC design layout may be based on the logic synthesis/circuit design performed at the IC designer (e.g., design stage 101), which may have also undergone routing and design rule check analysis at the IC designer.

At step 203, the manufacturability analysis stage 111 determines one or more design constructs based on analysis of the data stream. The one or more design constructs can be new layout shapes and/or features, such as new VIAs, or specific layout change instructions, such as ECOs. The one or more design constructs enhance the manufacturability and yield of the IC design layout. The analysis may be one or more simulation-based methods of analysis and/or one or more model-based methods of analysis of the data stream. The manufacturer can perform more advanced analyses of the data stream than what can be performed at the IC designer based on DRCs, such as by using highly-accurate manufacturability models (e.g., lithographic or other manufacturing-based models) that are not available to the IC designers.

At step 205, the manufacturability analysis stage 111 determines one or more instructions to implement the one or more design constructs at the design stage 101. The one or more instructions are based on optimization of the design constructs to limit the information that is passed back to the design stage 101. Thus, the instructions back to the design stage 101 are reduced in computational complexity based on the optimization for faster processing of post-layout data preparation. As discussed in detail below, the instructions may be one or more router-specific directives that provide the design stage 101 optimized information regarding the design constructs and characteristics to implement the design constructs. Providing the instructions regarding the manufacturability analysis and yield enhancement from the manufacturability analysis stage 111 back to the design stage 101 allows the IC designer to perform an analysis of the IC design layout changes to account for yield enhancing changes in the analysis and sign-off on the design metrics. After the IC design layout information is passed back to the design stage 101 from the manufacturability analysis stage 111 and the design stage 101 is able to act on the information, additional subsequent iterations of the above process 200 may occur, or the IC designer can perform the conventional process flow of IC design layout sign-off for subsequent IC manufacturing.

Figure 3:
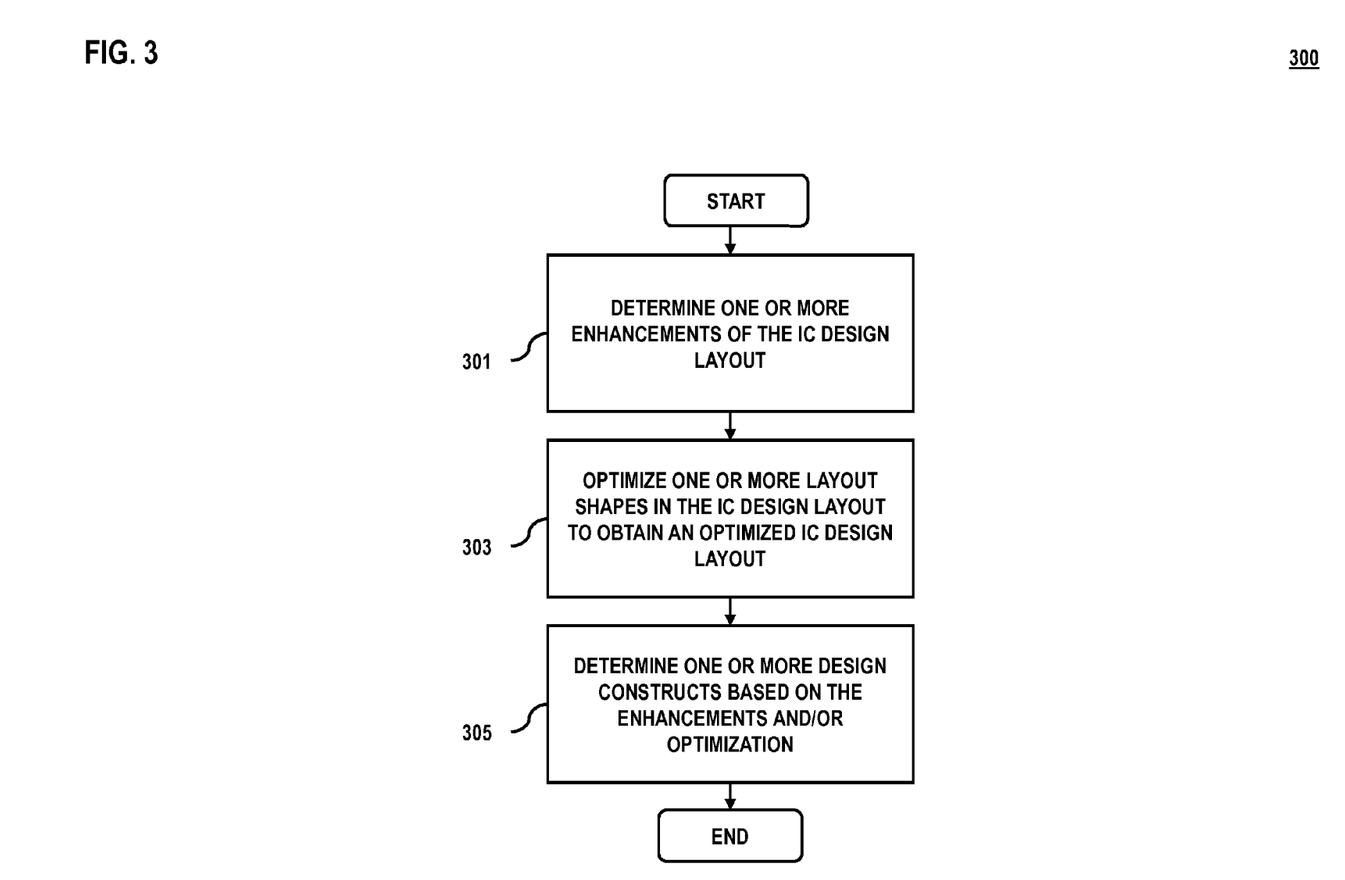
FIG. 3 is a flowchart of a process for determining one or more design constructs from implementing one or more enhancements and/or optimizations, according to an exemplary embodiment.

FIG. 3 is a flowchart of a process for determining one or more design constructs for implementing one or more enhancements and/or optimizations, according to an exemplary embodiment. At step 301, the manufacturability analysis stage 111 determines one or more enhancements to the IC design layout based on one or more of layout density, printability, hotspots, and critical-area effects associated with the IC design layout. The one or more enhancements may be determined according to one or more simulation-based and/or model-based analysis methods.

At step 303, the manufacturability analysis stage 111 optimizes one or more layout shapes in the IC design layout to obtain an optimized IC design layout. The IC design layout may include, for example, a VIA and/or a wire interconnect that may be associated with one or more errors and/or faults within the IC design layout based on the manufacturability analysis. The manufacturability analysis stage 111 may optimize the IC design layout by replacing the VIA and/or the wire interconnect with another VIA (or adding a second VIA) and/or a different wire interconnect, such as a thicker wire interconnect, that will cure the one or more errors and/or faults. Subsequently, at step 305, the manufacturability analysis stage 111 determines one or more design constructs based on the one or more enhancements and/or the optimization of the one or more layout shapes. The design constructs are then sent to the design stage 101 for implementation into the IC design layout, as discussed in more detail below.

Figure 4:
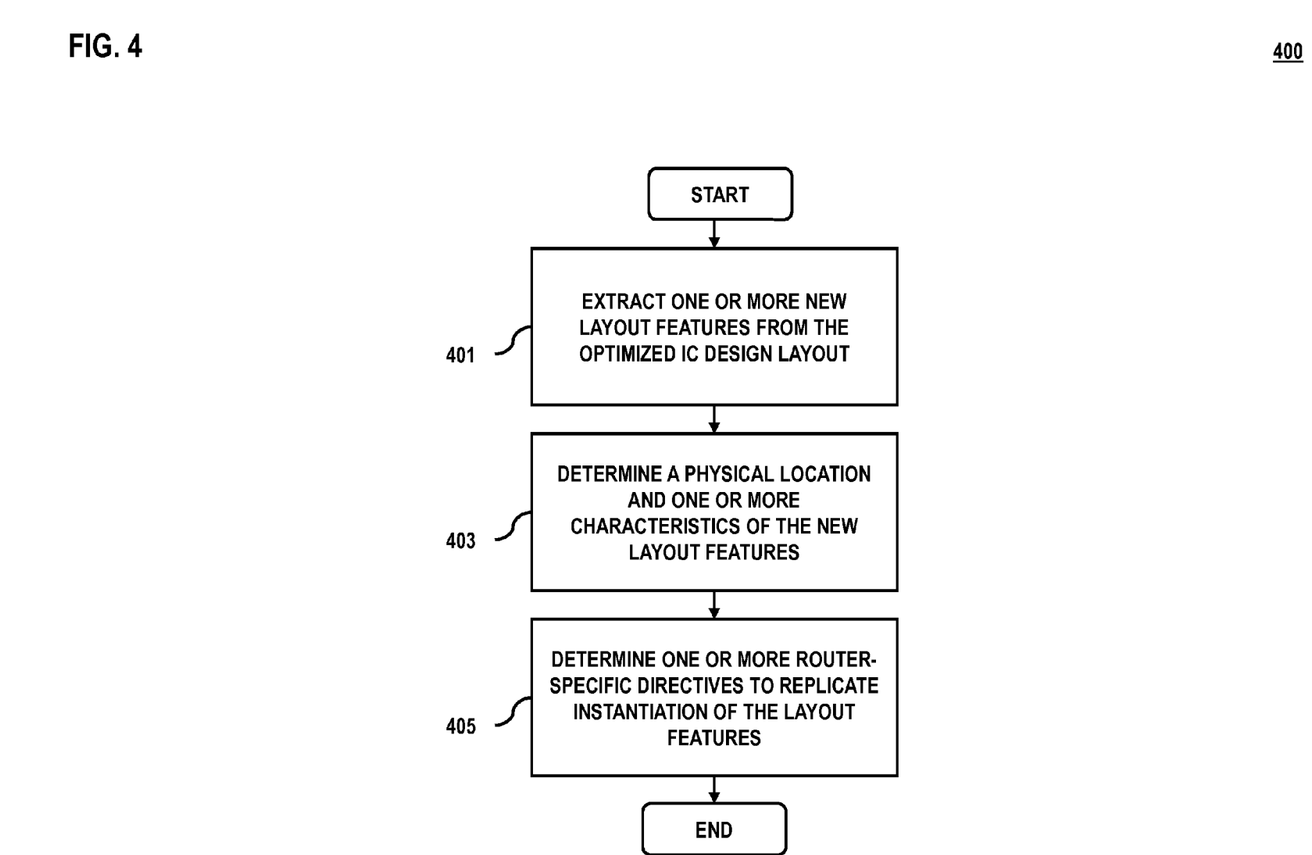
FIG. 4 is a flowchart of a process for determining router-specific directives for replicating instantiations of layout features, according to an exemplary embodiment.

FIG. 4 is a flowchart of a process for determining router-specific directives for replicating instantiations of layout features, according to an exemplary embodiment. At step 401, the manufacturability analysis stage 111 extracts one or more new layout features and/or shapes from the optimized IC design layout. The new layout features and/or shapes may be made up of hundreds or thousands of polygons within the data stream of the IC design layout. The manufacturability analysis stage 111 then determines a physical location and one or more characteristics of the one or more new layout features, at step 403. The characteristics may include distances from other features and/or shapes within the IC design layout. The information regarding the new layout features and/or shapes may be stored in the shape database 121, in addition to the location and the characteristics of the new layout features and/or shapes.

Next, at step 405, the manufacturability analysis stage 111 determines one or more router-specific directives to replicate instantiation of the one or more new layout features. The router-specific directives provide information to the design stage 101 to implement the one or more new layout features, as discussed in detail with respect to FIG. 5 below.

Figure 5:
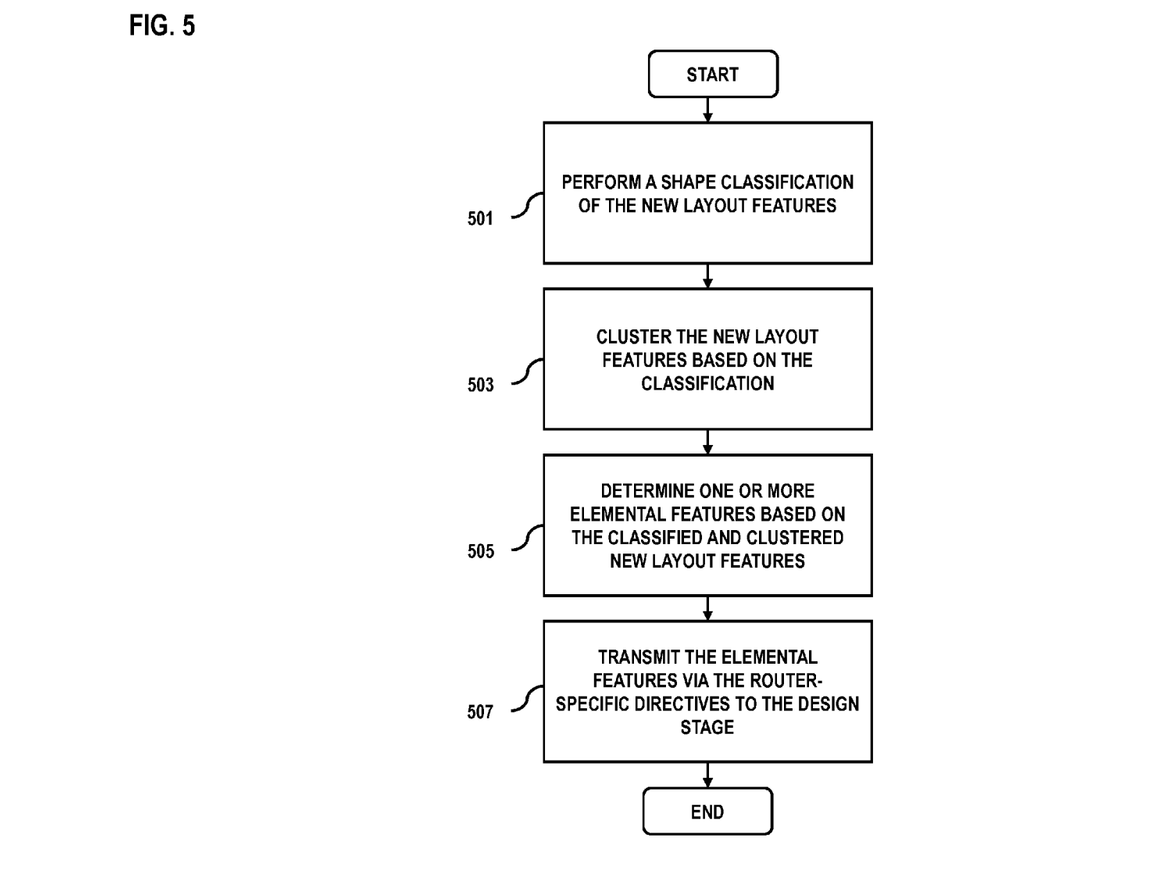
FIG. 5 is a flowchart of a process for transmitting optimized features through one or more router-specific directives to the design stage, according to an exemplary embodiment.

FIG. 5 is a flowchart of a process for transmitting optimized features through one or more router-specific directives to the design stage, according to an exemplary embodiment. At step 501, the manufacturability analysis stage 111 performs a shape classification of new layout features and/or shapes determined during the manufacturability analysis and yield enhancement. Additionally, at step 503, the manufacturability analysis stage 111 clusters the one or more new layout features and/or shapes based on the classification. Thus, the new layout features and/or shapes are grouped together based on their classification. Each classification of the layout shapes and/or features may include many different shapes and/or features that are grouped together into a classification.

Subsequently, at step 505, the manufacturability analysis stage 111 determines one or more elemental features based on the classified and clustered one or more new layout features. The one or more elemental features and/or shapes may define the one or more new layout features and/or shapes based on repetitions of the one or more elemental features and/or shapes. The one or more elemental shapes may also correspond to the classified and clustered shapes from steps 501 and 503. For example, each cluster of shapes and/or features may be represented by a single, or several, element shapes and/or features. As discussed above, a new layout shape in the shape of an L may be represented by multiple repetitions of an elemental shape in the shape of a square. The one or more router specific directives are then based on the elemental features and/or shapes, in addition to the locations and the characteristics that the elemental features represent. Accordingly, the one or more instructions, including the one or more router specific directives, can take new shapes and/or features that may include thousands of polygons of information with respect to the data stream (e.g., GDS, GDSII, OASIS, etc.), and represent the information based on repetitions of the elemental features and/or shapes and the corresponding characteristics.

At step 507, the manufacturability analysis stage 111 transmits the one or more elemental features via the one or more router-specific directives to the design stage 101 to replicate instantiation of the one or more new layout features and/or shapes. Accordingly, the information previously contained in the thousands of polygons that represent the new layout features and/or shapes may be drastically reduced to a small number of elemental features (e.g., polygons) that are repeated to construct the new layout shapes and/or features.

Figure 6:
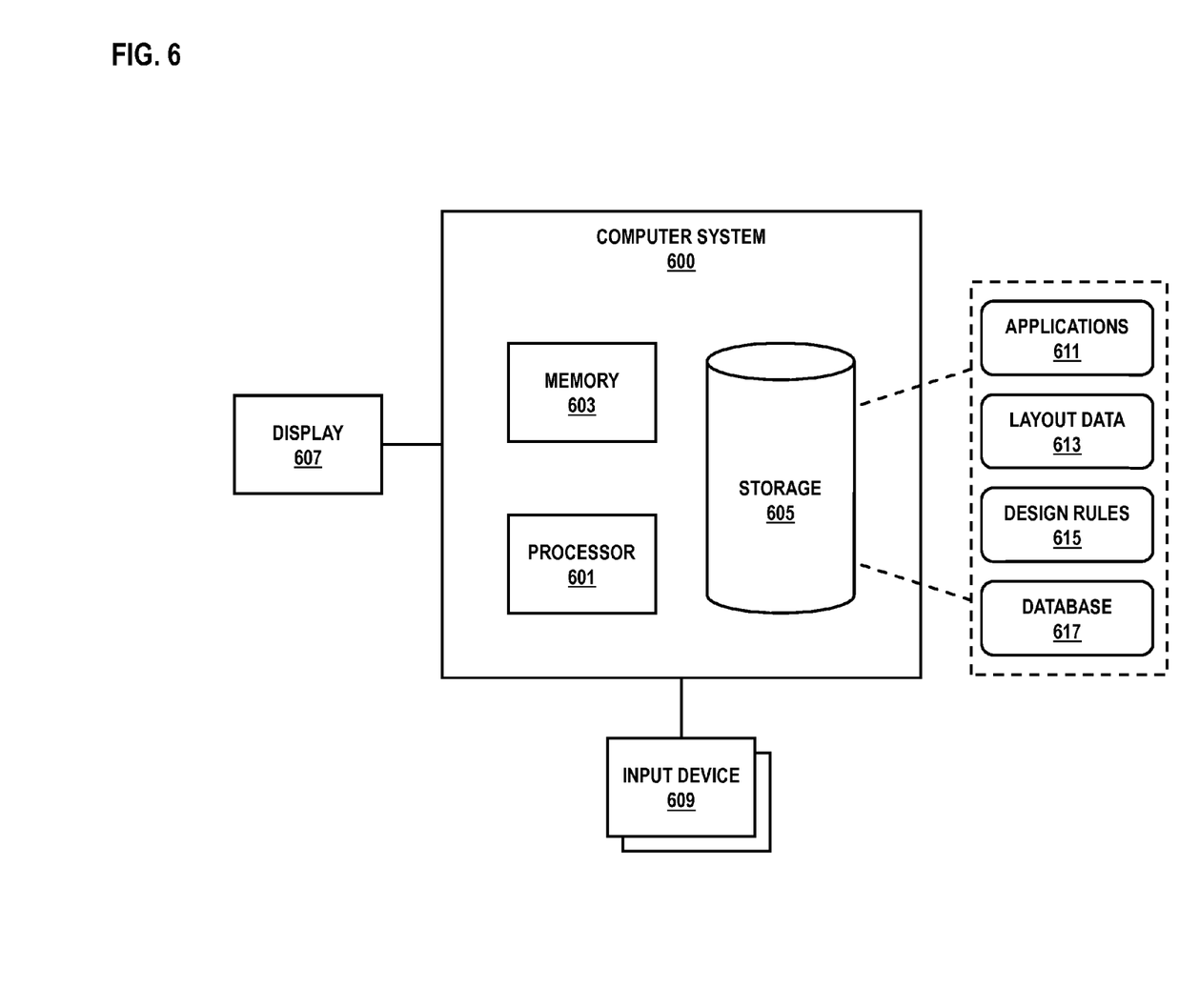
FIG. 6 schematically illustrates a computer system for implementing the processes of FIGS. 2 through 5, according to an exemplary embodiment.

The processes described herein may be implemented via software, hardware, firmware, or a combination thereof. Exemplary hardware (e.g., computing hardware) is schematically illustrated in FIG. 6. As shown, computer system 600 includes at least one processor 601, at least one memory 603, and at least one storage 605. Computer system 600 may be coupled to display 607 and one or more input devices 609, such as a keyboard and a pointing device. Display 607 may be utilized to provide one or more GUI interfaces. Input devices 609 may be utilized by users of computer system 600 to interact with, for instance, the GUI interfaces. Storage 605 may store applications 611, layout data (or information) 613, design plus rules 615, and at least one shape database (or repository) 617. Applications 611 may include instructions (or computer program code) that when executed by processor 601 cause computer system 600 to perform one or more processes, such as one or more of the processes described herein. In exemplary embodiments, applications 611 may include one or more manufacturability analysis and/or yield enhancement tools.

The embodiments of the present disclosure can achieve several technical effects, including the possibility of analysis of layout changes on design metrics and post-layout enhancements to IC data streams, such as opportunistic insertion of redundant VIAs and shapes to enhance manufacturability. The present disclosure enjoys industrial applicability associated with the designing and manufacturing of any of various types of semiconductor devices used in microprocessors, smart phones, mobile phones, cellular handsets, set-top boxes, DVD recorders and players, automotive navigation, printers and peripherals, networking and telecom equipment, gaming systems, and digital cameras.

In the preceding description, the present disclosure is described with reference to specifically exemplary embodiments thereof. It will, however, be evident that various modifications and changes may be made thereto without departing from the broader spirit and scope of the present disclosure, as set forth in the claims. The specification and drawings are, accordingly, to be regarded as illustrative and not as restrictive. It is understood that the present disclosure is capable of using various other combinations and embodiments and is capable of any changes or modifications within the scope of the inventive concept as expressed herein.

What is claimed is:

1. A method comprising:
    receiving a data stream of an integrated circuit design layout from a design stage;
    optimizing, by a processor, one or more layout shapes in the integrated circuit design layout to obtain an optimized integrated circuit design layout;
    extracting one or more new layout features from the optimized integrated circuit design layout;
    determining a physical location and one or more characteristics of the one or more new layout features; and
    determining, at a manufacture stage, one or more router-specific directives to replicate instantiation of the one or more new layout features at the design stage.

2. The method according to claim 1, further comprising:
    determining one or more enhancements based on one or more of a layout density, a printability, a hotspot, and a critical-area effect associated with the integrated circuit design layout; and
    determining one or more design constructs based on an analysis of the data stream and the one or more enhancements.

3. The method according to claim 2, further comprising:
    enhancing the integrated circuit design layout according to one or more engineering change orders based on the one or more design constructs.

4. The method of claim 1, wherein the one or more new layout features include at least one vertical interconnect access (VIA).

5. The method according to claim 1, further comprising:
    performing a shape classification of the one or more new layout features; and
    clustering the one or more new layout features based on the shape classification.

6. The method according to claim 5, further comprising:
    determining one or more elemental features based on the classified and clustered one or more new layout features, wherein the one or more router-specific directives are based on the one or more elemental features.

7. The method according to claim 6, further comprising:
    transmitting the one or more elemental features via the one or more router-specific directives to the design stage to replicate instantiation of the one or more new layout features.

8. An apparatus comprising:
    at least one processor; and
    at least one memory including computer program code for one or more programs, the at least one memory and the computer program code configured to, with the at least one processor, cause the apparatus to perform at least the following,
        receive a data stream of an integrated circuit design layout from a design stage;
        optimize, by a processor, one or more layout shapes in the integrated circuit design layout to obtain an optimized integrated circuit design layout;
        extract one or more new layout features from the optimized integrated circuit design layout;
        determine a physical location and one or more characteristics of the one or more new layout features; and
        determine, at a manufacture stage, one or more router-specific directives to replicate instantiation of the one or more new layout features at the design stage.

9. The apparatus according to claim 8, wherein the apparatus is further caused to:
    determine one or more enhancements based on one or more of a layout density, a printability, a hotspot, and a critical-area effect associated with the integrated circuit design layout; and
    determine one or more design constructs based on an analysis of the data stream and the one or more enhancements.

10. The apparatus according to claim 9, wherein the apparatus is further caused to:
    enhance the integrated circuit design layout according to one or more engineering change orders based on the one or more design constructs.

11. The apparatus of claim 8, wherein the one or more new layout features include at least one vertical interconnect access (VIA).

12. The apparatus according to claim 8, wherein the apparatus is further caused to:
    perform a shape classification of the one or more new layout features; and
    cluster the one or more new layout features based on the shape classification.

13. The apparatus according to claim 12, wherein the apparatus is further caused to:
    determine one or more elemental features based on the classified and clustered one or more new layout features, wherein the one or more router-specific directives are based on the one or more elemental features.

14. The apparatus according to claim 13, wherein the apparatus is further caused to:
    transmit the one or more elemental features via the one or more router-specific directives to the design stage to replicate instantiation of the one or more new layout features.

15. A method comprising:
    receiving a data stream of an integrated circuit design layout from a design stage;
    performing manufacturability analysis and yield-enhancement analysis on the integrated circuit design layout;
    determining, by a processor, one or more new layout shapes, one or more new layout structures, or a combination thereof;
    optimizing the one or more new layout shapes, the one or more new layout structures, or a combination thereof;
    determining, at a manufacture stage, one or more router-specific directives based on the one or more optimized layout shapes, the one or more optimized layout structures, or a combination thereof to replicate instantiation of the one or more new layout features at the design stage; and
    transmitting the one or more router-specific directives to the design stage.

16. The method according to claim 15, wherein the one or more new layout structures include a vertical interconnect access (VIA).

* * * * *